(12) United States Patent
Kato et al.

(10) Patent No.: US 12,108,423 B2
(45) Date of Patent: Oct. 1, 2024

(54) TRANSMISSION APPARATUS, TRANSMISSION METHOD, RECEPTION APPARATUS, AND RECEPTION METHOD

(71) Applicant: SONY SEMICONDUCTOR SOLUTIONS CORPORATION, Kanagawa (JP)

(72) Inventors: Nobuo Kato, Kanagawa (JP); Seiji Kobayashi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 402 days.

(21) Appl. No.: 17/311,774

(22) PCT Filed: Dec. 4, 2019

(86) PCT No.: PCT/JP2019/047340
§ 371 (c)(1),
(2) Date: Jun. 8, 2021

(87) PCT Pub. No.: WO2020/129634
PCT Pub. Date: Jun. 25, 2020

(65) Prior Publication Data
US 2022/0030595 A1 Jan. 27, 2022

(30) Foreign Application Priority Data
Dec. 17, 2018 (JP) ................. 2018-235682

(51) Int. Cl.
*H04W 72/53* (2023.01)
*H04W 4/06* (2009.01)
(Continued)

(52) U.S. Cl.
CPC ............ *H04W 72/53* (2023.01); *H04W 4/06* (2013.01); *H04W 4/90* (2018.02); *H04W 72/0453* (2013.01)

(58) Field of Classification Search
None
See application file for complete search history.

(56) References Cited

U.S. PATENT DOCUMENTS

2007/0194906 A1* 8/2007 Sink ..................... G08B 27/003
340/506
2010/0296467 A1 11/2010 Pelletier et al.
(Continued)

FOREIGN PATENT DOCUMENTS

CN 102440057 A 5/2012
CN 103120004 A 5/2013
(Continued)

OTHER PUBLICATIONS

International Search Report and Written Opinion of PCT Application No. PCT/JP2019/047340, issued on Feb. 25, 2020, 09 pages of ISRWO.

*Primary Examiner* — German Viana Di Prisco
(74) *Attorney, Agent, or Firm* — CHIP LAW GROUP

(57) ABSTRACT

The present disclosure relates to a transmission apparatus, a transmission method, a reception apparatus, and a reception method that can ensure a reduced processing burden on a receiving side in LPWA (Low Power Wide Area) communication.
Communication data is sent and received at a communication time of day and a communication frequency based on group identification information set for groups into which a plurality of transmission apparatuses is divided and communication interval information shared by the transmission apparatuses and a reception apparatus, rather than individual (Continued)

identification information. The present disclosure is applicable to an LPWA communication system.

18 Claims, 12 Drawing Sheets

(51) Int. Cl.
*H04W 4/90* (2018.01)
*H04W 72/0453* (2023.01)

(56) References Cited

U.S. PATENT DOCUMENTS

| | | | |
|---|---|---|---|
| 2013/0036238 A1* | 2/2013 | Chowdhary | H04L 69/04 |
| | | | 709/247 |
| 2013/0077565 A1* | 3/2013 | Jacobs | H04W 88/08 |
| | | | 370/328 |
| 2013/0286957 A1 | 10/2013 | Bucknell et al. | |
| 2014/0233736 A1* | 8/2014 | Zhang | H04L 63/065 |
| | | | 380/270 |
| 2015/0373205 A1* | 12/2015 | Li | H04M 15/66 |
| | | | 455/406 |
| 2018/0176718 A1* | 6/2018 | VerSteeg | G01S 1/0428 |
| 2018/0191398 A1 | 7/2018 | Kobayashi et al. | |
| 2018/0375887 A1* | 12/2018 | Dezent | H04L 43/08 |
| 2019/0058711 A1* | 2/2019 | Zhu | H04L 67/306 |
| 2019/0208363 A1* | 7/2019 | Shapiro | G16H 40/63 |

FOREIGN PATENT DOCUMENTS

| | | |
|---|---|---|
| CN | 107852190 A | 3/2018 |
| JP | 2012-525083 A | 10/2012 |
| JP | 2017-069593 A | 4/2017 |
| JP | 2017-147484 A | 8/2017 |
| JP | 6259550 B1 | 1/2018 |
| KR | 10-2012-0003488 A | 1/2012 |
| TW | 201127167 A | 8/2011 |
| WO | 2010/124228 A2 | 10/2010 |
| WO | 2012/041363 A1 | 4/2012 |
| WO | 2017/212810 A1 | 12/2017 |

* cited by examiner

TRANSMISSION APPARATUS, TRANSMISSION METHOD, RECEPTION APPARATUS, AND RECEPTION METHOD

CROSS REFERENCE TO RELATED APPLICATIONS

This application is a U.S. National Phase of International Patent Application No. PCT/JP2019/047340 filed on Dec. 4, 2019, which claims priority benefit of Japanese Patent Application No. JP 2018-235682 filed in the Japan Patent Office on Dec. 17, 2018. Each of the above-referenced applications is hereby incorporated herein by reference in its entirety.

TECHNICAL FIELD

The present disclosure relates to a transmission apparatus, a transmission method, a reception apparatus, and a reception method and particularly to a transmission apparatus, a transmission method, a reception apparatus, and a reception method that can ensure a reduced processing burden on a receiving side in LPWA (Low Power Wide Area) communication.

BACKGROUND ART

A communication technology using LPWA (Low Power Wide Area) communication has been proposed (refer to PTL 1).

The LPWA communication unidirectionally sends or receives a small amount of payload data (approximately 100 bits) from an IoT terminal (transmission apparatus) to an IoT gateway (reception apparatus) at a low bitrate. This makes it possible for the IoT terminal (transmission apparatus) performing the LPWA communication to achieve communication with low power consumption.

CITATION LIST

Patent Literature

[PTL 1]
Japanese Patent No. 6259550

SUMMARY

Technical Problems

In the LPWA communication described above, it is necessary to install reception apparatuses over a wide area in order to expand a range within which the communication from transmission apparatuses can be covered.

In particular, in regions that cannot be readily reached by radio waves such as mountainous regions, an environment that permits access to a server apparatus is not in place. Accordingly, a possible solution would be to cover the range by installing a repeater or the like and relaying a signal received from a transmission apparatus to a reception apparatus capable of communication.

In the LPWA communication, in order to achieve low power consumption of a transmission apparatus, it is necessary for a reception apparatus to individually accept communication from a number of transmission apparatuses by changing a timing and frequency, and the more transmission apparatuses, the higher processing burden required for the reception, thus resulting in a larger configuration of the apparatus and larger power consumption.

Meanwhile, mountainous regions and the like are often located in an environment where commercial power is not available and only limited supply of electric power is available such as that from solar cells.

Accordingly, in order to achieve a repeater that accepts communication from a number of transmission apparatuses and relays to a reception apparatus in the LPWA communication intended to ensure the reduced processing burden on transmission apparatuses, it is necessary to achieve a repeater with lower power consumption that ensures a reduced processing burden on the receiving side in the LPWA communication.

The present disclosure has been devised in light of the foregoing, and particularly, it is an object of the present disclosure to ensure a reduced processing burden related to the reception in the LPWA communication.

Solution to Problems

A transmission apparatus of a first aspect of the present disclosure includes a transmission control section adapted to control transmission of communication data to a reception apparatus at a communication time of day and a communication frequency based on individual identification information of the transmission apparatus itself and communication interval information shared by the transmission apparatus itself and the reception apparatus. The transmission control section controls, in specific communication, the transmission of the communication data to the reception apparatus at the communication time of day and the communication frequency based on group identification information set for a group to which the transmission apparatus itself belongs when a plurality of transmission apparatuses including the transmission apparatus itself is divided into a plurality of groups and the communication interval information shared by the transmission apparatus itself and the reception apparatus.

A transmission method of the first aspect of the present disclosure corresponds to a configuration of the transmission apparatus.

In the first aspect of the present disclosure, the transmission of the communication data to the reception apparatus is controlled at the communication time of day and the communication frequency based on the individual identification information of the transmission apparatus itself and the communication interval information shared by the transmission apparatus itself and the reception apparatus. In the specific communication, the transmission of the communication data to the reception apparatus is controlled at the communication time of day and the communication frequency based on the group identification information set for the group to which the transmission apparatus itself belongs when the plurality of transmission apparatuses including the transmission apparatus itself is divided into the plurality of groups and the communication interval information shared by the transmission apparatus itself and the reception apparatus.

A reception apparatus of a second aspect of the present disclosure includes a reception control section adapted to control reception of communication data at a communication time of day and a communication frequency based on individual identification information of a plurality of transmission apparatuses and communication interval information shared by the transmission apparatuses and the reception apparatus itself. The reception control section controls, in specific communication, the reception of the communication data at the communication time of day and the communication frequency based on group identification information set for a group to which the transmission apparatus belongs when the plurality of transmission apparatuses is divided into a plurality of groups and the communication interval information shared by the transmission apparatus and the reception apparatus itself.

A reception method of the second aspect of the present disclosure corresponds to a configuration of the reception apparatus.

In the second aspect of the present disclosure, the reception of the communication data is controlled at the communication time of day and the communication frequency based on the individual identification information of the plurality of transmission apparatuses and the communication interval information shared by the transmission apparatuses and the reception apparatus itself. In the specific communication, the reception of the communication data is controlled at the communication time of day and the communication frequency based on the group identification information set for the group to which the transmission apparatus belongs when the plurality of transmission apparatuses is divided into the plurality of groups and the communication interval information shared by the transmission apparatus and the reception apparatus itself.

DESCRIPTION OF EMBODIMENT

Figure 1:
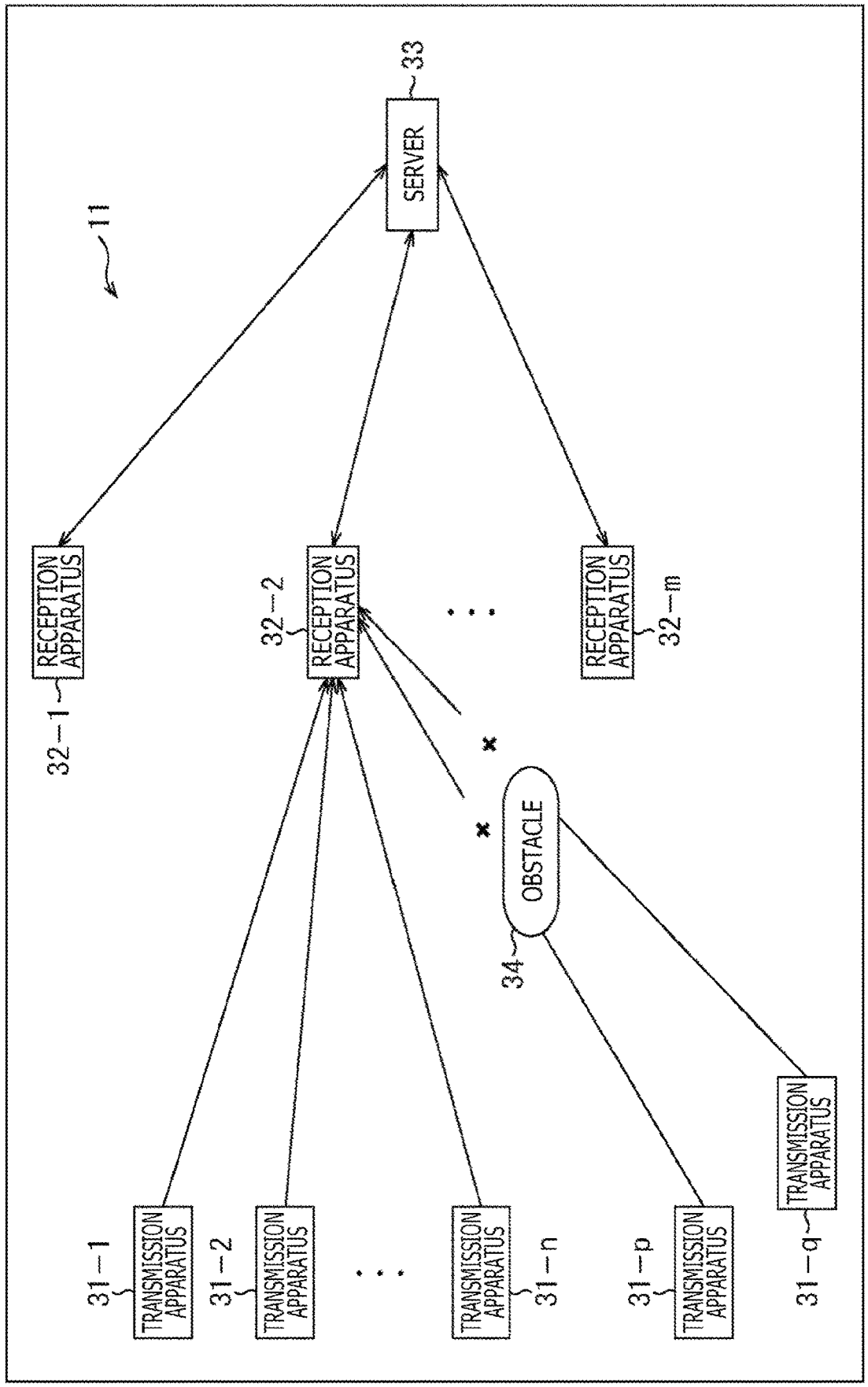
FIG. 1 is a diagram outlining a unidirectional communication system using LPWA communication.

A detailed description will be given below of a preferred embodiment of the present disclosure with reference to attached drawings. It should be noted that, in the present specification and drawings, redundant description will be avoided by denoting components having substantially the same functional configuration by the same reference sign.

A description will be given below of a mode for carrying out the present technology. The description will be given in the following order.
1. Outline of unidirectional communication system using LPWA communication
2. Outline of present disclosure
3. Hardware configuration example of transmission apparatus
4. Hardware configuration example of repeater
5. Configuration examples of functions achieved by transmission apparatus
6. Configuration examples of functions achieved by repeater
7. Transmission process by transmission apparatus
8. Relaying process by repeater
9. Example of performing processes by software <<1. Outline of Unidirectional Communication System Using LPWA Communication>>

A unidirectional communication system using LPWA (Low Power Wide Area) communication will be outlined with reference to FIG. 1.

A communication system 11 using the LPWA communication illustrated in FIG. 1 includes transmission apparatuses 31-1 to 31-$q$, reception apparatuses 32-1 to 32-$m$, and a server 33.

It should be noted that, in the case where there is no need to distinguish between the transmission apparatuses 31-1 to 31-$q$ and between the reception apparatuses 32-1 to 32-$m$, these apparatuses will be simply referred to as the transmission apparatuses 31 and the reception apparatuses 32, and other components will be similarly referred to.

The transmission apparatus 31 is arranged together with various types of sensors, not depicted, that are provided in a variety of environments or is owned by a predetermined user or the like, acquires sensor data detected by the sensors, not depicted, in the respective environments, and sends the sensor data to the server 33 via the reception apparatus 32.

The reception apparatus 32 is controlled in operation by the server 33, receives the sensor data sent from the transmission apparatus 31, and sends the sensor data to the server 33.

The server 33 not only controls operation of the reception apparatus 32 but also receives the sensor data sent from the transmission apparatus 31 via the reception apparatus 32 and executes various types of application programs commensurate with the sensor data received.

The sensor data is sent to the transmission apparatus 31 and the reception apparatus 32 through the LPWA communication. In the LPWA communication, the sensor data is sent unidirectionally from the transmission apparatus 31 to the reception apparatus 32.

To be more specific, the plurality of transmission apparatuses 31 find transmission times of day and transmission frequencies at which to send the sensor data through predetermined computations by using, for example, identifiers for individually identifying themselves, sending the sensor data to the reception apparatus 32 at the found transmission times of day and transmission frequencies.

The reception apparatus 32 acquires, in advance from the server 33, the identifiers of the transmission apparatuses 31, one for each apparatus 31, from which the sensor data is likely to be received. The reception apparatus 32 computes, on the basis of the acquired identifiers by a computation similar to that performed by the transmission apparatuses 31, the transmission time of day and transmission frequency at which the sensor data is sent from each of the transmission apparatuses 31. Then, the reception apparatus 32 receives the sensor data sent at the computed transmission time of day and transmission frequency.

As described above, the transmission apparatuses 31 and the reception apparatus 32 send and receive the sensor data at the transmission times of day and transmission frequencies computed on the basis of the identifiers of the transmission apparatuses 31.

As a result, it is only necessary for the transmission apparatuses 31 to unidirectionally send the sensor data to the reception apparatus 32, thus allowing to achieve communication with low power consumption.

Incidentally, in the case where there is an obstacle 34 such as a mountainous region that obstructs communication between the transmission apparatuses 31-$p$ and 31-$q$ and the reception apparatus 32-2 as illustrated, for example, in FIG. 1, the communication between the transmission apparatuses 31-$p$ and 31-$q$ and the reception apparatus 32-2 becomes impossible.

<<2. Outline of Present Disclosure>>

Figure 2:
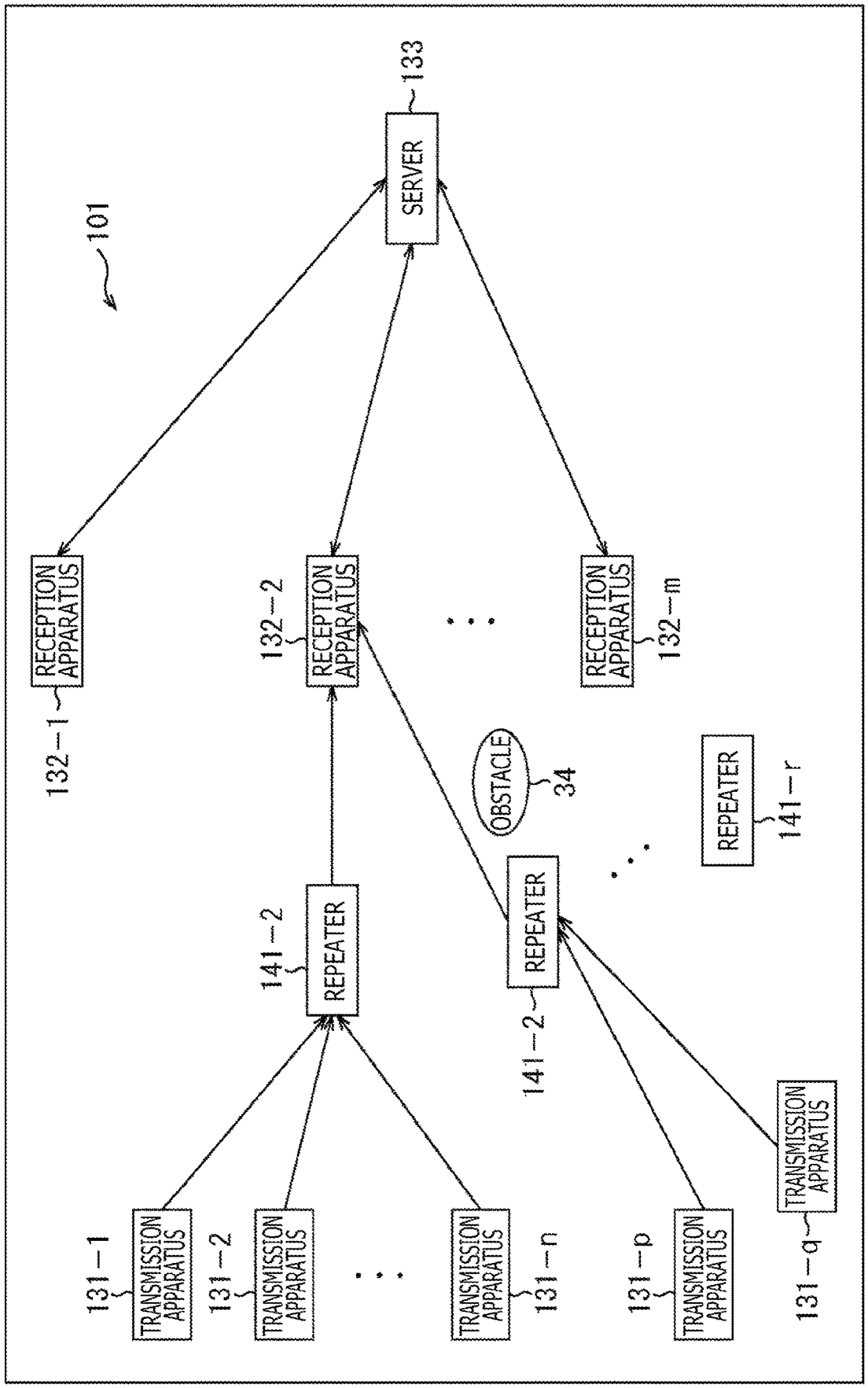
FIG. 2 is a diagram outlining a communication system of the present disclosure.

Accordingly, in the communication system of the present disclosure, a repeater 141 is provided between transmission apparatuses 131 and a reception apparatus 132 in such a manner that data is sent and received between the transmission apparatuses 131 and the reception apparatus 132 via the repeater 141 as illustrated in FIG. 2.

To be more specific, a communication system 101 illustrated in FIG. 2 includes transmission apparatuses 131 to 131-$q$, reception apparatuses 132-1 to 132-$m$, a server 133, and repeaters 141-1 and 141-2.

It should be noted that basic functions of the transmission apparatuses 131, the reception apparatuses 132, and the server 133 are similar to those of the transmission apparatuses 31, the reception apparatuses 32, and the server 33 of FIG. 1, respectively.

The repeater 141 receives transmission data including sensor data in a payload sent from the transmission apparatuses 131 and sends the transmission data to the reception apparatus 132.

It should be noted that, although FIG. 2 depicts that all the transmission data from the transmission apparatuses 131 is relayed by the repeater 141 and sent to the reception apparatus 132, the transmission data may be directly received by the reception apparatus 132 in an environment where the reception apparatus 132 can receive signals from the transmission apparatuses 131 with more ease than the repeater 141.

Also, here, the transmission apparatuses 131 are configured, for example, like a warning beeper for notifying occurrence of an emergency situation. To be more specific, the transmission apparatus 131 as a warning beeper includes a manipulation section to be manipulated in the event of an emergency, and if the manipulation section is manipulated, information regarding a current position is acquired by a built-in GPS section, and the current position is sent to the reception apparatus 132 via the repeater 141 together with information indicating the occurrence of the emergency situation.

When information including position information and indicating the occurrence of the emergency situation is received, the reception apparatus 132 outputs the information to the server 133.

The server 133 alerts the police and a security firm together with the position information on the basis of information indicating the occurrence of the emergency situation received from the reception apparatus 132.

That is, the communication system 101 of the present disclosure as a whole is intended as a crime prevention system.

Also, the repeater 141 is installed in a space where it is possible to avoid a communication failure caused by the obstacle 34 such as a mountainous region, does not have a large-scale configuration using commercial power as does the ordinary reception apparatus 132, and instead, runs on small-capacity power such as a solar cell or other natural energy installed on a mountaintop in the mountainous region or a battery.

Accordingly, it is necessary for the repeater 141 to be more compact in configuration and lower in power consumption than the reception apparatus 132.

As described above, in the LPWA communication, as the number of transmission apparatuses 131 increases, it is necessary for the apparatus on the receiving side to be prepared for the reception of transmission signals from the variety of transmission apparatuses 131 by changing the transmission time, the transmission frequency, and the like as many times as the number of transmission apparatuses 131, thus resulting in an increased processing burden and processing time related to the reception.

As a result, as the number of transmission apparatuses 131 increases, the processing burden and the processing time will increase on the receiving side, thus resulting in increased power consumption.

However, the communication system 101 of the present disclosure as a whole is intended as a crime prevention system.

Accordingly, it is necessary to expand a coverage area to include mountainous regions by using the compact and low-power-consuming repeaters 141.

As described above, patterns of the individual transmission time and the transmission frequency of the transmission apparatuses 131 are set by using the identifiers for identifying the respective transmission apparatuses 131. As a result, as long as the number of patterns of the transmission time and the transmission frequency to be changed does not increase even if the number of transmission apparatuses 131 increases, it is possible to suppress the processing burden and processing time in the apparatus on the receiving side from being increased.

Figure 3:
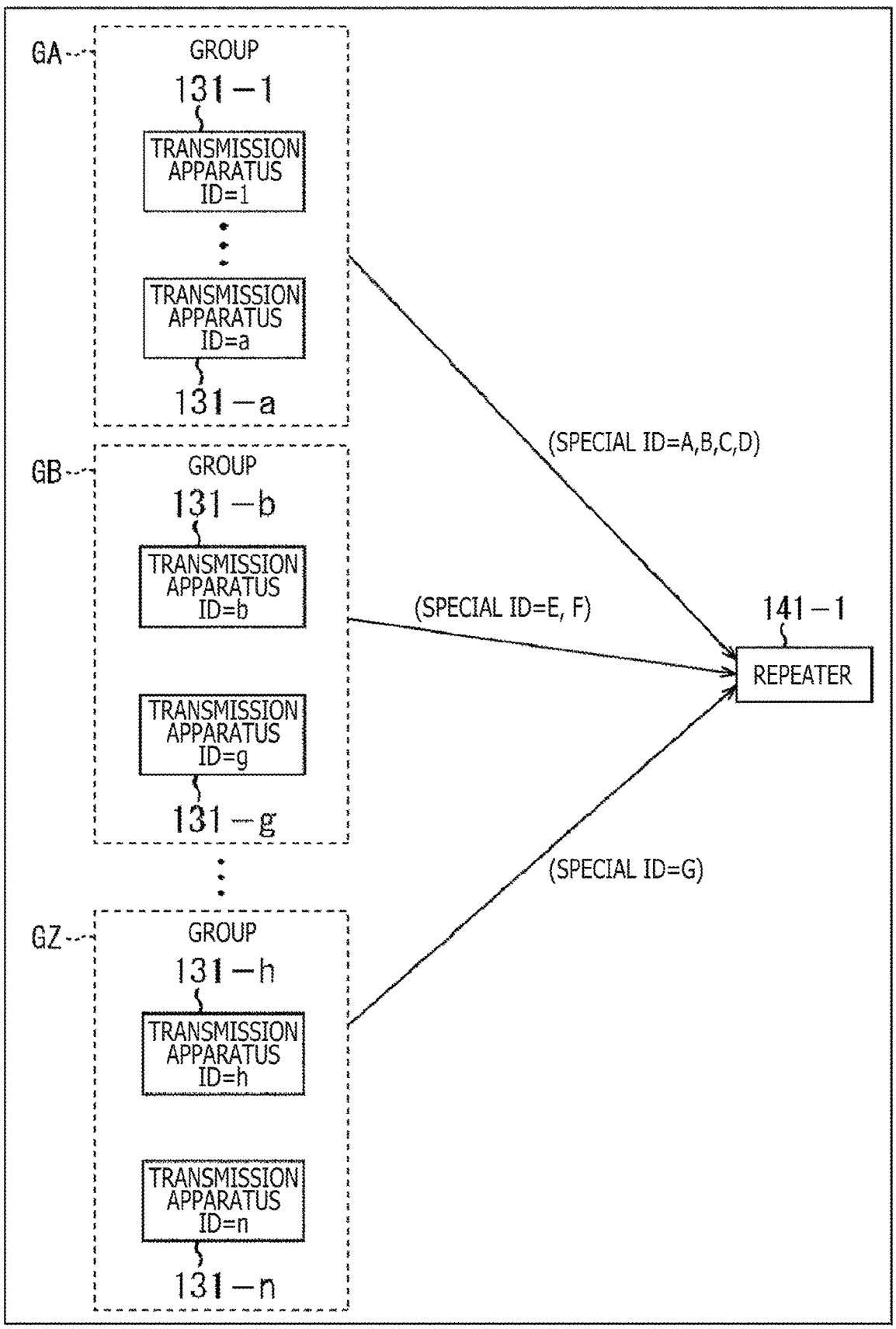
FIG. 3 is a diagram describing communication using group-by-group special IDs after dividing a plurality of transmission apparatuses into groups in the communication system illustrated in FIG. 2.

Accordingly, in the present disclosure, the processing burden and processing time on the receiving side are reduced by dividing the transmission apparatuses 131 into a plurality of groups, setting the identifier for each of the groups, and setting the transmission times and the transmission frequencies with group-by-group identifiers as illustrated in FIG. 3.

Here, the plurality of group-by-group identifiers may be set for one group because transmission processes may occur simultaneously from the plurality of transmission apparatuses 131 in the same group and lead to a collision. It should be noted, however, that there is only an extremely low probability of a collision resulting from the simultaneous occurrence of the transmission processes in the plurality of transmission apparatuses 131 in the same group. Accordingly, it is only necessary to set the plurality of identifiers whose number is sufficiently small for the number of transmission apparatuses 131 included in the group. Also, in the case where there are not so many transmission apparatuses 131 included in the group, there may be only one group-by-group identifier because the collision is unlikely to occur.

Also, the identifier of the individual transmission apparatus 131 is normally placed in a header of the transmission data, thus making it possible to identify which transmission apparatus 131 sent the transmission data.

However, in the case where the group-by-group identifier is used, the group-by-group identifier is placed in place of the individual identifier of the transmission apparatus 131, thus making it impossible to identify which transmission apparatus 131 sent the transmission data although it is possible to identify the group to which the transmission apparatus 131 that sent the transmission data belongs.

Accordingly, in the present disclosure, in the case where the group-by-group identifier is placed in the header, the transmission apparatus 131 that sent the transmission data is made identifiable by placing the identifier of the transmission apparatus 131 in part of the payload.

That is, in FIG. 3, for example, the transmission apparatuses 131-1 to 131-a whose identifiers are from ID=1 to ID=a are set as a group GA, and the group-by-group identifiers are set as special IDs=A, B, C, and D.

Also, the transmission apparatuses 131-b to 131-g whose identifiers are from ID=b to ID=g are set as a group GB, and the group-by-group identifiers are set as special IDs=E and F.

Further, the transmission apparatuses 131-h to 131-n whose identifiers are from ID=h to ID=n are set as a group GC, and the group-by-group identifier is set as a special ID=C.

In the case where the transmission apparatuses 131 are managed by using the individual identifiers, it has been necessary to manage a reception process by switching between n patterns of the transmission time of day and the transmission frequency whose IDs=1 to n.

However, in the repeater 141 illustrated in FIG. 3, it is only necessary to set three different patterns of the transmission time and the transmission frequency whose special IDs=A, B, and C and perform the reception process by switching between these patterns, thus allowing for reduction of the processing burden and processing time related to the reception process.

For example, in the case where there are approximately several thousands of transmission apparatuses 131, and if these transmission apparatuses 131 are divided, for example, into eight groups or so, the processing burden and processing time related to the reception process in the repeater 141 will be reduced to approximately one several hundredth.

As a result, the repeater 141 can achieve lower power consumption, allowing to achieve the functions as the repeater even in the environment where commercial power is not available by using, for example, small-capacity power such as a solar cell power generation system or a battery.

Also, in the case where the group-by-group identifiers are used, it is possible to identify the transmission apparatus 131 that sent the transmission data, by placing the individual identifier in the payload of the transmission data.

<<3. Hardware Configuration Example of Transmission Apparatus>>

A description will be given next of a hardware configuration example of the transmission apparatus 131 with reference to FIG. 4.

The transmission apparatus 131 includes a control section 151, a GPS 152, a manipulation section 153, a communication section 154, a storage section 155, a drive 156, a removable storage section 157, and a bus 158.

The control section 151, the GPS 152, the manipulation section 153, the communication section 154, the storage section 155, the drive 156, and the removable storage section 157 are connected to each other via the bus 158, thus allowing for transfer of data and programs therebetween.

The control section 151 includes a processor, a memory, and the like and controls the operation of the transmission apparatus 131 as a whole.

Also, the control section 151 generates the transmission data on the basis of position information acquired by the communication section GPS 152 in the case where the manipulation section 153 is manipulated that is to be manipulated when it is necessary to indicate the occurrence of the emergency situation. Then, the control section 151 determines the transmission time of day and the transmission frequency on the basis of the special ID, the identifier for identifying the group as described with reference to FIG. 3, and sends the transmission data by controlling the communication section 154.

It should be noted that, although intended to function as what is generally called a warning beeper that is intended to indicate the occurrence of the emergency situation, the transmission apparatus 131 of the present disclosure can also send the transmission data for a purpose other than in the event of the emergency situation.

In the description given hereinafter, transmission intended for the occurrence of the emergency situation will be referred to as special transmission, and any other transmission will be referred to as normal transmission.

The GPS (Global Positioning System) 152 receives a signal from a satellite that is not depicted, acquires time-of-day information together with the position information, and outputs these pieces of information to the control section 151.

The manipulation section 153 includes a piece of cord that is pulled out in the event of the emergency, a button, or the like and outputs a signal commensurate with the manipulation to the control section 151. That is, the control section 151 recognizes that the emergency situation has occurred when the manipulation section 153 is manipulated, and performs the special transmission at this time, and performs the normal transmission at any other time.

The communication section 154 is controlled by the control section 151, generates the transmission data including sensor data that includes the position information, and sends the data to the reception apparatus 132 or the repeater 141 through the LPWA communication.

The storage section 155 includes an HDD (Hard Disk Drive), an SSD (Solid State Drive), a semiconductor memory, or the like and is controlled by the control section 151, and various types of data and programs are written thereto and read therefrom. Here, a unique identifier (LPWA_ID) for identifying the transmission apparatus 131 is stored.

The drive 156, for example, writes data to and reads data from the removable storage section 157 such as a semiconductor memory. The identifier of the transmission apparatus 131 may be stored in the removable storage section 157.

<<4. Hardware Configuration Example of Repeater>>

A description will be given next of a hardware configuration example of the repeater 141 with reference to FIG. 5.

The repeater 141 includes a control section 171, a GPS 172, a manipulation section 173, a communication section 174, a storage section 175, a drive 176, a removable storage section 177, and a bus 178. The control section 171, the GPS 172, the manipulation section 173, the communication section 174, the storage section 175, the drive 176, and the removable storage section 177 are connected to each other via the bus 178, thus allowing for transfer of data and programs therebetween.

The control section 171 includes a processor, a memory, and the like and controls the operation of the repeater 141 as a whole.

Also, the control section 171 acquires, in advance, the identifier (LPWA_ID) of the transmission apparatus 131 that will send the transmission data and the identifier (special ID) of the group of the transmission apparatus 131, from the reception apparatus 132 or the server 133.

The control section 171 finds, in advance, which transmission apparatus 131 or which group of the transmission apparatuses 131 will send the transmission data at what time of day and at which transmission frequency for each of the LPWA_IDs and the special IDs by performing the same computation as by a computation scheme of the transmission apparatus 131, makes a list thereof, and stores the list.

The control section 171 identifies, on the basis of the stored list, the reception time of day associated with the transmission apparatus 131 or the group of the transmission apparatuses 131 and reads information regarding the corresponding transmission frequency.

Then, when the reception time of day arrives, the control section 171 controls the communication section 174 to receive the transmission data sent at the corresponding transmission frequency.

Further, the control section 171 controls the communication section 174 to send the transmission data sent from the transmission apparatus 131 to the server 133 through common LPWA communication. In this case, the reception apparatus 132 functions as a transmission apparatus in the LPWA communication.

The GPS (Global Positioning System) 172 receives a signal from a satellite that is not depicted, acquires time-of-day information together with the position information, and outputs these pieces of information to the control section 171.

The manipulation section 173 includes a keyboard, a manipulation button, or the like and outputs a signal commensurate with the manipulation to the control section 171.

The communication section 174 is controlled by the control section 171, receives the transmission data sent from the transmission apparatus 131, and sends the data to the reception apparatus 132 through the LPWA communication.

The storage section 175 includes an HDD (Hard Disk Drive), an SSD (Solid State Drive), a semiconductor memory, or the like and is controlled by the control section 151, and various types of data and programs are written thereto and read therefrom. The storage section 175 stores the identifiers (LPWA_IDs) for individually identifying the transmission apparatuses 131 that send the transmission data and the identifiers (special IDs) for identifying the groups to which the transmission apparatuses 131 belong and also stores information regarding the reception times of day and the transmission frequencies calculated by the same computation scheme as that in the transmission apparatuses 131 on the basis of the identifiers.

The drive 176, for example, writes data to and reads data from the removable storage section 177 such as a semiconductor memory.

<<5. Configuration Examples of Functions Achieved by Transmission Apparatus>>

Figure 6:
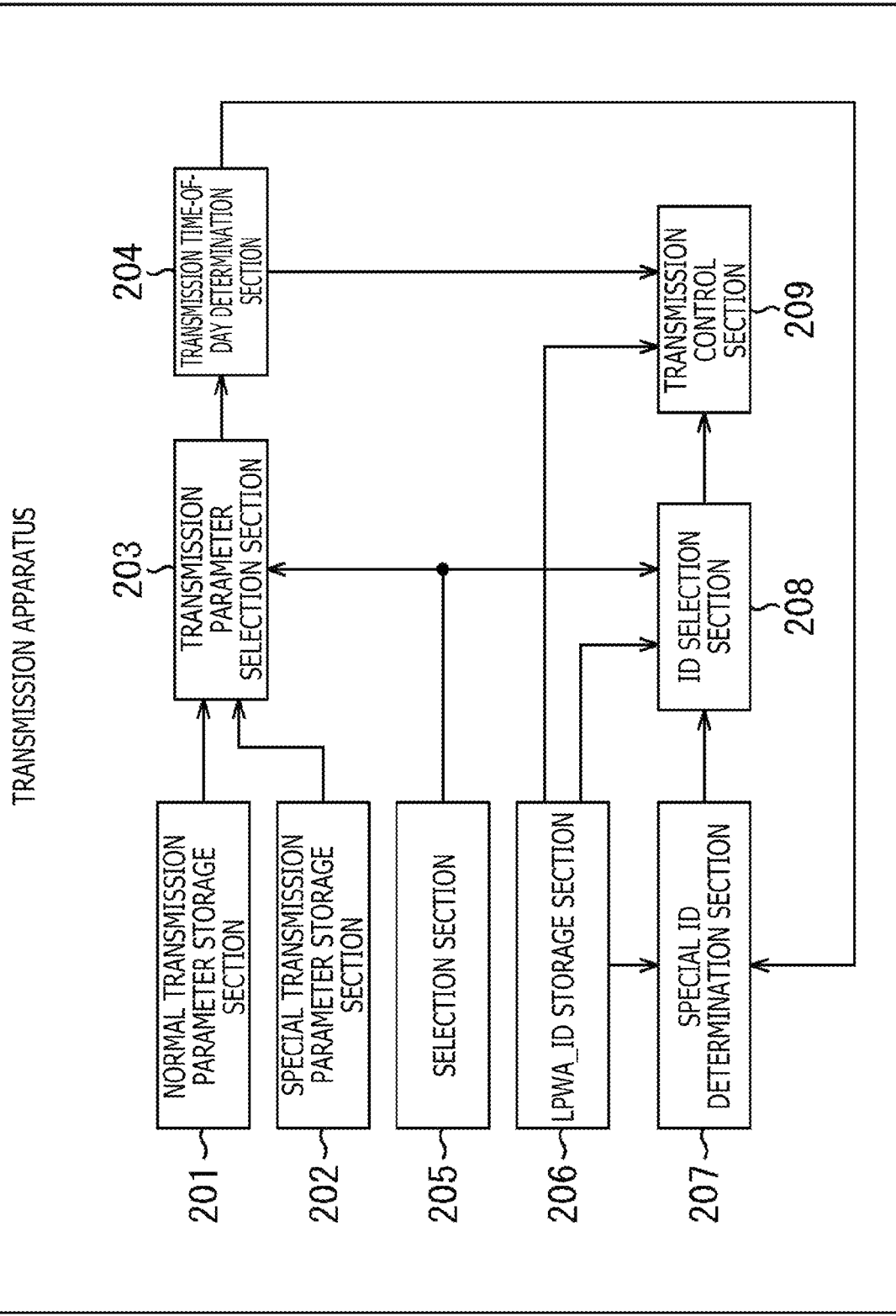
FIG. 6 is a functional block diagram describing functions achieved by the transmission apparatus illustrated in FIG. 4.

A description will be given next of the functions achieved by the transmission apparatus 131 with reference to a functional block diagram illustrated in FIG. 6. In reality, the functions achieved by the transmission apparatus 131 are achieved by the control section 151 of the transmission apparatus 131.

The transmission apparatus 131 includes a normal transmission parameter storage section 201, a special transmission parameter storage section 202, a transmission parameter selection section 203, a transmission time-of-day determination section 204, a selection section 205, an LPWA_ID storage section 206, a special ID determination section 207, an ID selection section 208, and a transmission control section 209.

The normal transmission parameter storage section 201 stores a normal transmission parameter that is a transmission parameter used by the transmission apparatus 131 during transmission of the transmission data in the normal transmission.

The special transmission parameter storage section 202 stores a special transmission parameter that is a transmission parameter used at the time of the emergency, i.e., when the manipulation section 153 of the transmission apparatus 131 is manipulated by the user.

The LPWA communication repeats, at predetermined intervals (burst intervals), a process of sending and receiving the same transmission data consecutively a plurality of times while at the same time switching between channels at predetermined timings (frame delay times) within a prescribed interval (slot period).

The transmission parameter prescribes a prescribed period (slot period), the predetermined timings (frame delay times) within the prescribed period, and the channels to be switched in this LPWA communication.

The selection section 205 outputs, to the transmission parameter selection section 203 and the ID selection section 208, a selection signal indicating that the emergency situation has occurred, commensurate with whether or not the manipulation section 153 has been manipulated.

In the case where a selection signal to be supplied from the selection section 205 is not supplied, i.e., in the case of the normal transmission, the transmission parameter selection section 203 reads the normal transmission parameter stored in the normal transmission parameter storage section 201 and outputs the parameter to the transmission time-of-day determination section 204.

Also, in the case where the selection signal to be supplied from the selection section 205 is supplied, i.e., in the case of the emergency situation and the normal transmission, the transmission parameter selection section 203 selects the special transmission parameter stored in the special transmission parameter storage section 202 and supplies the parameter to the transmission time-of-day determination section 204.

The transmission time-of-day determination section 204 determines the transmission time of day on the basis of the normal transmission parameter or the special transmission parameter selected by the transmission parameter selection section 203 and current time-of-day information acquired by the GPS 152 and outputs the transmission time of day to the special ID determination section 207 and the transmission control section 209. At this time, the transmission time-of-day determination section 204 determines the transmission time of day by the computation used to determine the transmission time of day in the LPWA communication.

The LPWA_ID storage section 206 stores the LPWA_ID as the identifier unique to the transmission apparatus 131, and supplies the LPWA_ID to the special ID determination section 207, the ID selection section 208, and the transmission control section 209. It should be noted that the LPWA_ID storage section 206 is the component corresponding to the storage section 155.

The special ID determination section 207 calculates the special ID, which is the identifier of the group to which the transmission apparatus 131 belongs when the transmission apparatuses 131 are set to the predetermined number of groups, from the transmission time of day supplied from the transmission time-of-day determination section 204 and the LPWA_ID stored in the LPWA_ID storage section 206 and outputs the special ID to the ID selection section 208. It should be noted that the configuration of the special ID determination section 207 will be described in detail later with reference to FIG. 8.

In the case where the selection signal to be supplied from the selection section 205 to indicate the occurrence of the emergency situation is not supplied, the ID selection section 208 selects the LPWA_ID stored in the LPWA_ID storage section 206 and outputs the LPWA_ID to the transmission control section 209 as a ModulationID.

Also, in the case where the selection signal to be supplied from the selection section 205 to indicate the occurrence of the emergency situation is supplied, the ID selection section 208 selects the special ID determined by the special ID determination section 207 and outputs the special ID to the transmission control section 209 as the ModulationID.

The transmission control section 209 controls the communication section 154 on the basis of transmission time-of-day information and the ModulationID to place the position information, acquired by the GPS 152, in the payload and send the data to the repeater 141 or the reception apparatus 132.

Figure 7:
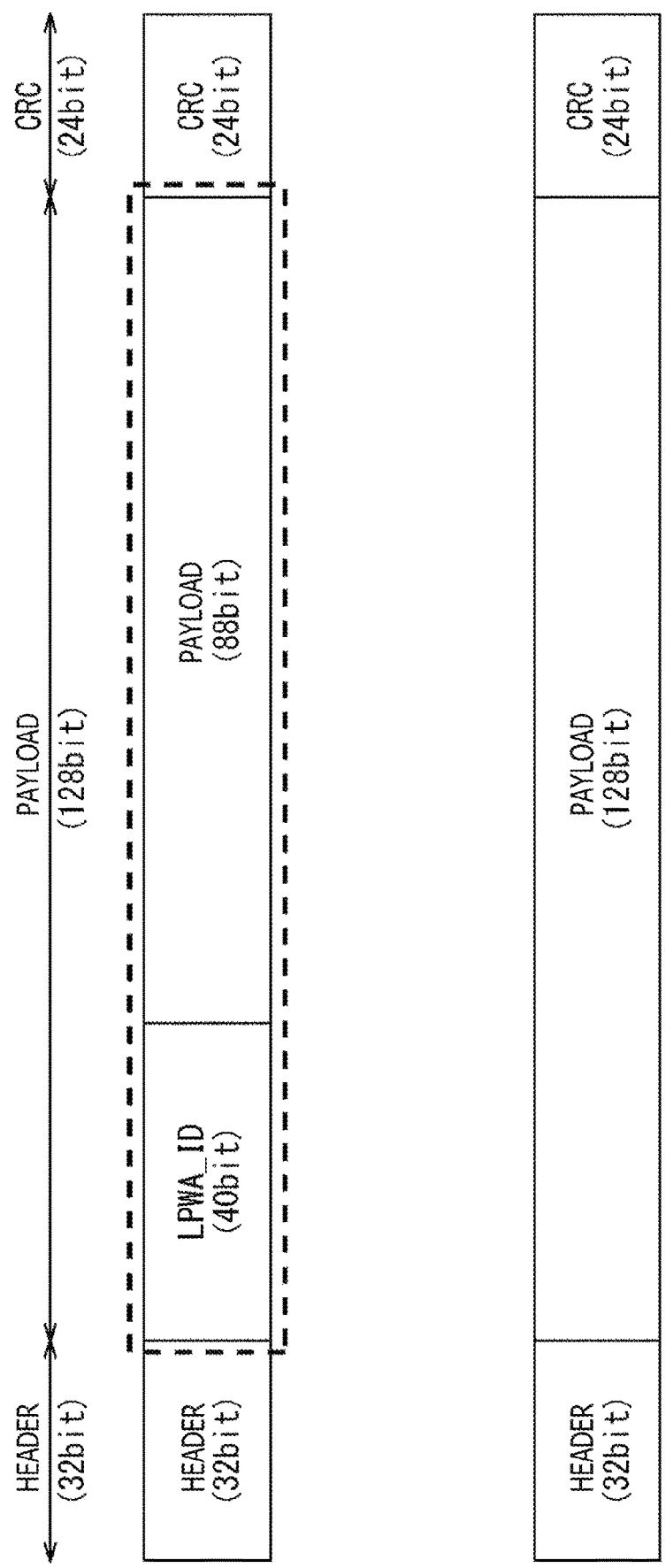
FIG. 7 is a diagram describing a transmission data format.

At this time, in the case where the ModulationID is the special ID, the transmission control section 209 generates the transmission data in a format as illustrated at the top in FIG. 7 and causes the communication section 154 to send the data.

That is, the transmission control section 209 generates the transmission data by placing the ModulationID including the special ID in a 32-bit header portion, placing the special ID in 40 bits of the 128-bit payload, placing the position information, acquired by the GPS 152, by using the remaining 88 bits, and further attaching a 24-bit CRC portion.

Also, in the case where the ModulationID is the LPWA_ID, the transmission control section 209 generates the transmission data in a format as illustrated at the bottom in FIG. 7 and causes the communication section 154 to send the data.

That is, the transmission control section 209 generates the transmission data by placing the LPWA_ID in the 32-bit header portion, placing the position information, acquired by the GPS 152, in the 128-bit payload, and further attaching the 24-bit CRC portion.

<Configuration Example of Special ID Determination Section>

Figure 8:
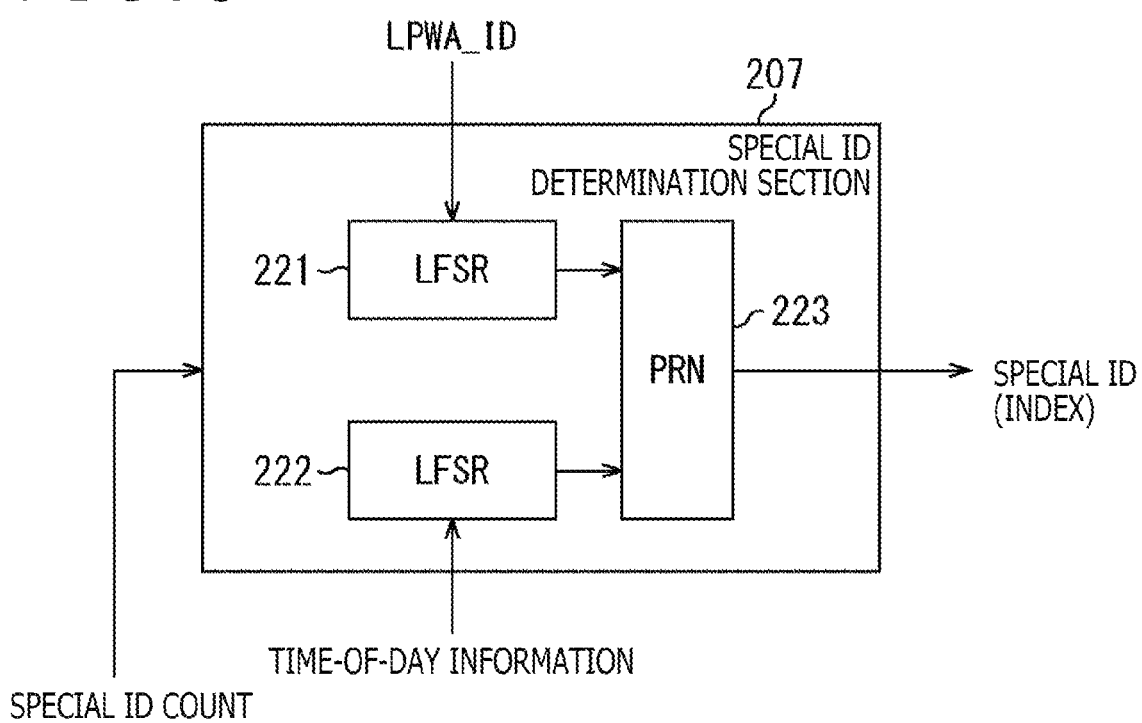
FIG. 8 is a functional block diagram describing a configuration example of a special ID determination section illustrated in FIG. 6.

A description will be given here of a configuration example of the special ID determination section 207 with reference to FIG. 8.

The special ID determination section 207 includes LFSRs 221 and 222 and a PRN 223.

The LFSRs (Linear Feedback Shift Registers) 221 and 222 compute, by using the LPWA_ID and the transmission time of day as initial values, respectively, LFSR polynomials whose number of bits are commensurate with a predetermined count set as the count of the special IDs and outputs the computation results to the PRN (Pseudo Random Number generation section) 223.

The pseudo random number generation section 223 generates a value that will be used as an index of the predetermined count of the special IDs by generating a pseudo random number (PRN) on the basis of the computation results of the LFSRs 221 and 222.

That is, the special ID determination section 207 outputs the index for identifying any one of the predetermined count of the special IDs on the basis of the LPWA_ID, the time-of-day information, and information regarding the count of the special IDs set for the group to which the transmission apparatus 131 itself belongs. Accordingly, in the case where the special ID is selected, the ID selection section 208 selects the special ID set in advance in association with the index on the basis of the index supplied from the special ID determination section 207.

Here, the time-of-day information need only be a parameter that ensures that different special IDs are set when the special transmissions are performed by the plurality of transmission apparatuses 131 and may be, for example, the time of day when the previous transmission was completed or the time of day when the manipulation section 153 was manipulated. Also, the count of the special IDs set for one group is specified, for example, in bits, and in the case of three bits, the count is specified, for example, as 8 (=$2^3$).

In this case, the transmission apparatus 131 allocates eight special IDs to one group on the basis of the LPWA_ID and the time-of-day information.

Accordingly, in the case where, of the transmission apparatuses 131 that belong to one group, eight or more transmission apparatuses 131 perform the special transmissions at the same time, a collision between the special IDs will occur. Accordingly, the count of the special IDs set for one group is required to be set commensurate, of the transmission apparatuses 131 set for one group, with the probability of the transmission apparatuses 131 performing the special transmissions at the same time, and it is only necessary to set the count that is enough to cover the maximum number required at the same time.

According to the configuration as described above, in the case where the emergency situation occurs, the transmission apparatus 131 generates the transmission data in the format having the special ID attached to the header and the LPWA_ID and the position information placed in the payload and sends the data to the repeater 141.

<<6. Configuration Examples of Functions Achieved by Repeater>>

Figure 9:
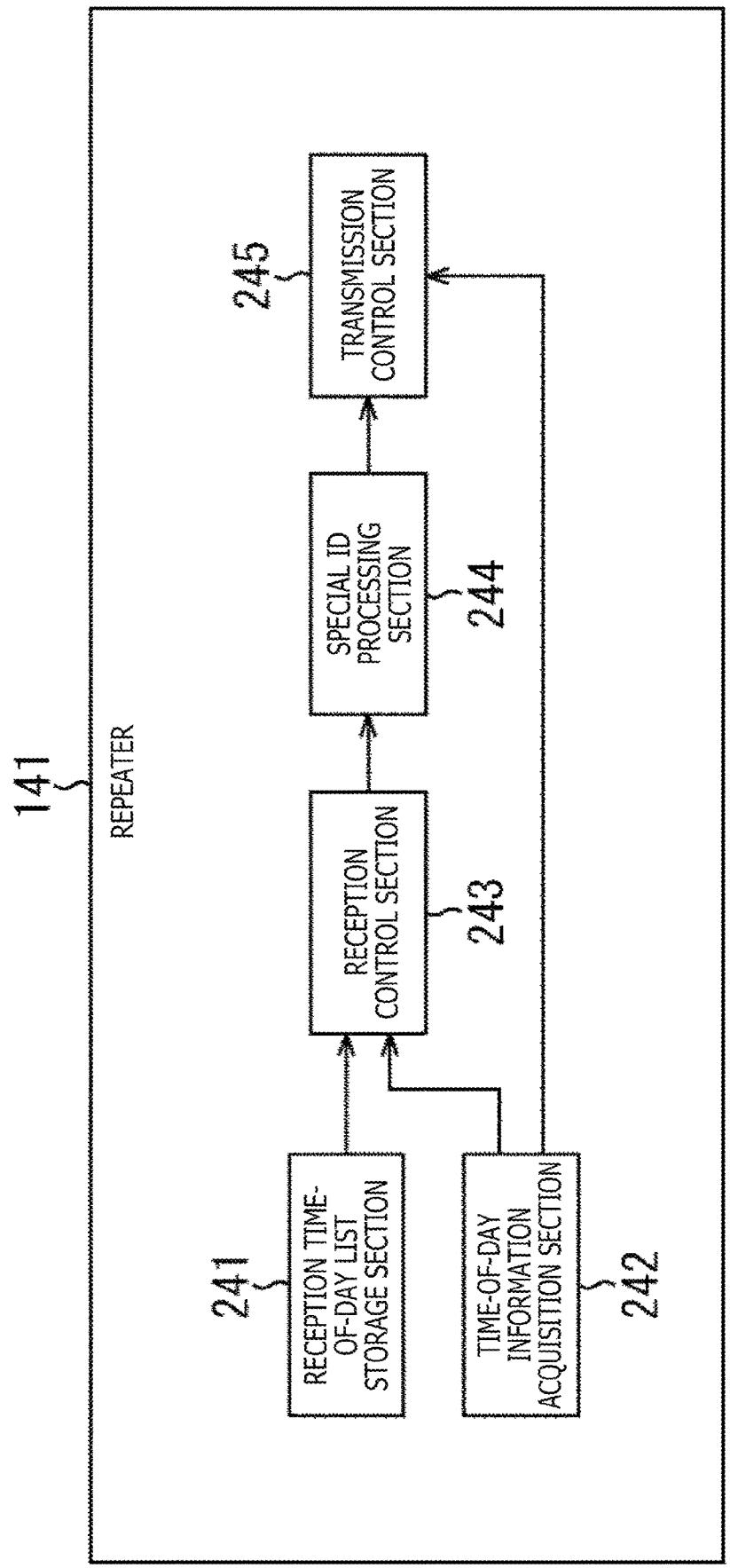
FIG. 9 is a functional block diagram describing functions achieved by the repeater illustrated in FIG. 5.

A description will be given next of the functions achieved by the repeater 141 with reference to a functional block diagram illustrated in FIG. 9. In reality, the functions achieved by the repeater 141 are achieved by the control section 171 of the repeater 141.

The repeater 141 includes a reception time-of-day list storage section 241, a time-of-day information acquisition section 242, a reception control section 243, a special ID processing section 244, and a transmission control section 245.

The reception time-of-day list storage section 241 stores information regarding a list of reception times of day when the transmission data is received from the transmission apparatuses 131 that are allocated one for each of the special IDs or LPWA_IDs of all the transmission apparatuses 131 that are likely to send the transmission data.

It should be noted that the reception times of day can be found on the basis of the transmission parameter shared by the transmission apparatus 131 and the repeater 141 or the reception apparatus 132 and the special ID or the LPWA_ID of the transmission apparatus 131.

Accordingly, the repeater 141 may calculate the reception time of day and store it in the reception time-of-day list storage section 241 when the special ID or the LPWA_ID of the transmission apparatus 131 that is likely to send the transmission data is acquired.

The special ID or the LPWA_ID of the transmission apparatus 131 that is likely to send the transmission data may be stored in the storage section 175 at the time of manufacture or may be supplied from the server 133 via the reception apparatus 132 at a predetermined timing.

Further, the transmission apparatus 131 sends the LPWA_ID at a specific set timing according to the shared transmission parameter. Then, the repeater 141 may acquire this LPWA_ID as the identifier of the transmission apparatus 131 that is likely to send the transmission data, find the reception time of day and the transmission frequency through the computation, and register the reception time of day and the transmission frequency in the reception time-of-day list storage section 241.

Also, the repeater 141 repeats the process of changing the transmission frequency commensurate with the reception time of day on the basis of the special ID or the LPWA_ID of the transmission apparatus 131. As a result, if the number of target transmission apparatuses 131 increases to a large number, that is, if the number of special IDs or LPWA_IDs increases to a large number, it becomes necessary to frequently change the transmission frequency commensurate with the reception time of day, thus resulting in the increased processing burden.

Accordingly, as far as the repeater 141 running on the small-capacity power such as a solar cell or a battery is concerned, it becomes possible to reduce the processing burden by communicating only with the special IDs to thereby reduce a frequency of changing the transmission frequency commensurate with the reception time of day, thus achieving not only reduced size and weight but also reduced power consumption of the repeater 141.

The time-of-day information acquisition section 242 acquires the current time-of-day information supplied from the GPS 172 and supplies the information to the reception control section 243 and the transmission control section 245.

The reception control section 243 decides from which transmission apparatus 131 the transmission data will be received on the basis of reception time-of-day information stored in the reception time-of-day list storage section 241 and the current time-of-day information supplied from the time-of-day information acquisition section 242.

Then, when the reception time of day arrives, the reception control section 243 controls the communication section 174 to receive the transmission data commensurate with the ModulationID corresponding to the special ID or the LPWA_ID and supply the data to the special ID processing section 244.

The special ID processing section 244 decides whether the ModulationID included in the header of the received transmission data is the normal LPWA_ID or the special ID, and in the case where the ModulationID is the special ID, that is, in the case of the special transmission, the special ID processing section 244 extracts the LPWA_ID and the position information placed in the payload. Then, the special ID processing section 244 generates the transmission data of the repeater 141 in the format having the extracted LPWA_ID placed in the header and the position information placed in the payload and outputs the data to the transmission control section 245.

Also, in the case where the ModulationID included in the header of the transmission data is the normal LPWA_ID, that is, in the case of the normal transmission, the special ID processing section 244 outputs the received transmission data in an 'as-is' manner to the transmission control section 245 as the transmission data of the repeater 141.

The transmission control section 245 controls the communication section 174 to relay the transmission data sent from the transmission apparatus 131 and send the data to the reception apparatus 132 as the transmission data of the repeater 141 through the normal LPWA communication.

<<7. Transmission Process by Transmission Apparatus>>

Figure 10:
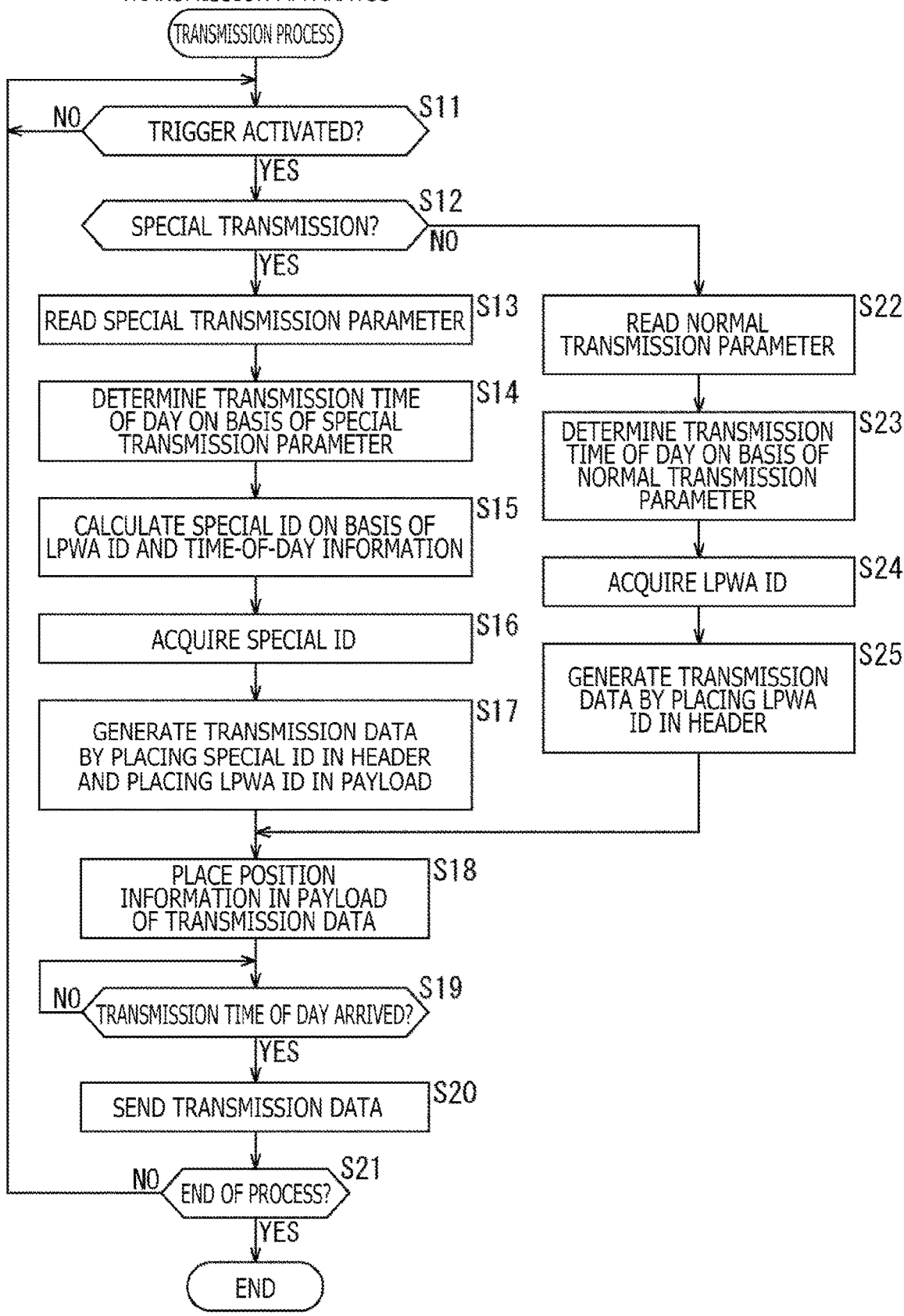
FIG. 10 is a flowchart describing a transmission process performed by the transmission apparatus.

A description will be given next of the transmission process by the transmission apparatus 131 with reference to a flowchart illustrated in FIG. 10.

In step S11, the selection section 205 recognizes a manipulation state of the manipulation section 153 and decides whether or not some kind of trigger has been activated and repeats the similar process until the trigger is activated.

The term "trigger" here refers, for example, to something that indicates not only whether the user has performed the manipulation that indicates the occurrence of the emergency situation but also whether the user has voluntarily performed the manipulation that causes the position information to be sent as the normal manipulation rather than that in the event of the emergency situation.

Accordingly, the process in step S11 is repeated until some kind of manipulation is performed.

In the case where it is considered that the trigger has been activated in step S11, the process proceeds to step S12.

In step S12, the selection section 205 decides whether or not the trigger indicates the occurrence of the emergency situation and therefore whether or not the special transmission has been performed. In the case of the special transmission in step S12, the process proceeds to step S13.

In step S13, the selection section 205 notifies, to the transmission parameter selection section 203 and the ID selection section 208, information indicating that the special transmission has been performed. Commensurate with this, the transmission parameter selection section 203 reads the special transmission parameter stored in the special transmission parameter storage section 202 and outputs the parameter to the transmission time-of-day determination section 204.

In step S14, the transmission time-of-day determination section 204 calculates the transmission time of day by the computation scheme in the LPWA communication on the basis of the current time-of-day information acquired by the GPS 152 and the special transmission parameter and outputs the transmission time of day to the special ID determination section 207 and the transmission control section 209.

In step S15, the special ID determination section 207 determines the special ID on the basis of the time-of-day information such as the time of day when the previous transmission was completed or the time of day when the manipulation section 153 was manipulated, the LPWA_ID in the LPWA_ID storage section 206, and the special ID count and outputs the special ID to the ID selection section 208.

In step S16, the ID selection section 208 acquires the special ID determined by the special ID determination section 207 and outputs the special ID to the transmission control section 209 as the ModulationID.

In step S17, the transmission control section 209 generates the transmission data by using the ModulationID including the special ID as the header and placing the LPWA_ID, stored in the LPWA_ID storage section 206, in the payload.

In step S18, the transmission control section 209 brings the transmission data to perfection by acquiring the position information from the GPS 152 and placing the position information in the payload together with the LPWA_ID.

In step S19, the transmission control section 209 acquires the time-of-day information from the GPS 152 and decides whether or not the transmission time of day has arrived and repeats the similar process until the transmission time of day arrives. Then, in the case where the transmission time of day arrives in step S19, the process proceeds to step S20.

In step S20, the transmission control section 209 controls the communication section 154 to send the transmission data to the repeater 141 or the reception apparatus 132 at the transmission frequency corresponding to the ModulationID.

In step S21, it is decided whether or not an instruction has been issued to terminate the transmission process, and in the case where it is decided that no instruction has been issued to terminate the transmission process, the process returns to step S11 to repeat the subsequent processes. Also, in the case where it is decided in step S21 that the instruction has been issued to terminate the transmission process, the process is terminated.

Also, in the case where it is decided in step S12 that the normal transmission has been performed rather than the special transmission, the process proceeds to step S22.

In step S22, the transmission parameter selection section 203 reads the normal transmission parameter stored in the normal transmission parameter storage section 201 and outputs the parameter to the transmission time-of-day determination section 204.

In step S23, the transmission time-of-day determination section 204 calculates the transmission time of day by the computation scheme in the LPWA communication on the basis of the current time-of-day information acquired by the GPS 152 and the normal transmission parameter and outputs the transmission time of day to the transmission control section 209 together with the normal transmission parameter.

In step S24, the transmission control section 209 acquires the LPWA_ID stored in the LPWA_ID storage section 206.

In step S25, the transmission control section 209 generates the transmission data in the format having the LPWA_ID stored in the header.

Then, the transmission data in the format using the LPWA_ID as the header and having the position information placed in the payload is sent by the subsequent processes from step S18 to step S20 at the transmission frequency corresponding to the ModulationID including the LPWA_ID.

The above processes make it possible to send the transmission data having the special ID set as the ModulationID and placed in the header and further having the LPWA_ID unique to the transmission apparatus 131 and the position information, sensing data, placed in the payload in the special transmission for notifying the occurrence of the emergency situation.

<<8. Relaying Process by Repeater>>

Figure 11:
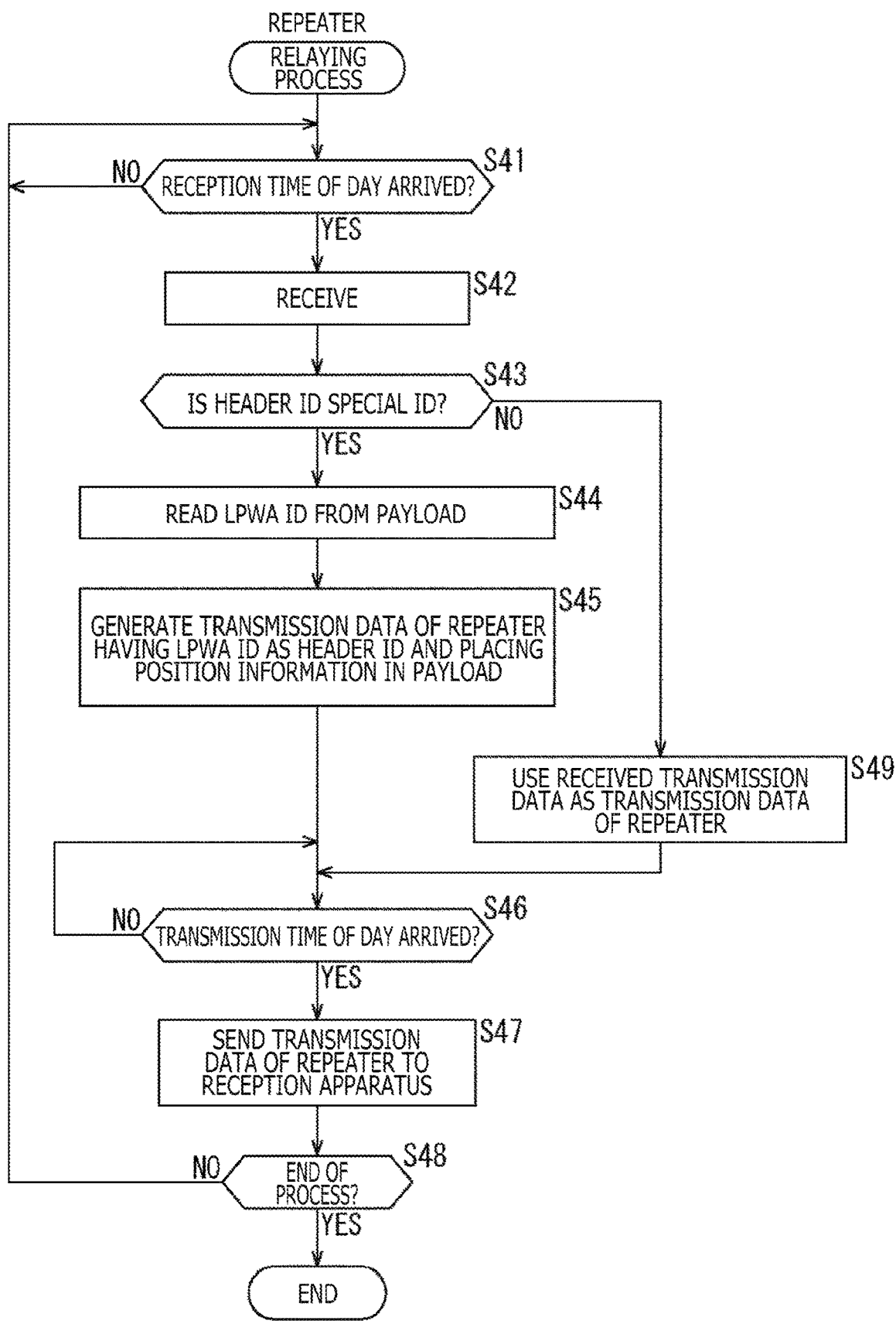
FIG. 11 is a flowchart describing a relaying process performed by the repeater.

A description will be given next of a relaying process by the repeater 141 with reference to a flowchart illustrated in FIG. 11.

In step S41, the reception control section 243 searches for the reception time-of-day information stored in the reception time-of-day list storage section 241 on the basis of the current time-of-day information supplied from the time-of-day information acquisition section 242, decides whether or not the reception time of day has arrived, and repeats the similar process until the reception time of day arrives.

In step S41, in the case where it is considered that the reception time of day has arrived, the process proceeds to step S42.

In step S42, the reception control section 243 causes the communication section 174 to receive the transmission data by controlling the reception frequency of the communication section 174 on the basis of the ModulationID including the special ID recorded in association with the reception time of day in the reception time-of-day list storage section 241 or the LPWA_ID and output the transmission data to the special ID processing section 244.

In step S43, the special ID processing section 244 decides, on the basis of the ModulationID placed in the header of the received transmission data, whether or not the ModulationID is the special ID, that is, whether or not the special transmission has been performed. In the case of the special ID, that is, in the case of the special transmission, the process proceeds to step S44.

In step S44, the special ID processing section 244 reads the LPWA_ID from the payload of the received transmission data.

In step S45, the special ID processing section 244 generates the transmission data of the repeater 141 in the format for the normal LPDA communication, using the read LPDA_ID as the header and having the sent position information placed in the payload, and outputs the data to the transmission control section 245.

In step S46, the transmission control section 245 decides, on the basis of the current time-of-day information supplied from the time-of-day information acquisition section 242, whether or not the transmission time of day to the reception apparatus 132 in the normal LPWA communication has arrived and repeats the similar process until the transmission time of day arrives.

Then, in the case where it is decided in step S46 that the transmission time of day has arrived, the process proceeds to step S47.

In step S47, the transmission control section 245 controls the communication section 174, on the basis of the ModulationID including the LPWA_ID, the header of the transmission data, to send the transmission data to the reception apparatus 132 through the normal LPWA communication.

In step S48, it is decided whether or not the instruction has been issued to terminate the relaying process, and in the case where no instruction has been issued to terminate the relaying process, the process returns to step S41 to repeat the subsequent processes. Also, in the case where the instruction has been issued to terminate the relaying process in step S48, the process is terminated.

Also, in the case where the header is not the special ID in step S43, that is, in the case where the header includes the LPWA_ID and, therefore, the normal transmission has been performed, the process proceeds to step S49.

In step S49, the special ID processing section 244 uses the received transmission data sent from the transmission apparatus 131 in an 'as-is' manner as the transmission data of the repeater 141, and the process proceeds to step S46. Then, the transmission data is sent to the reception apparatus 132 by the steps S46 to S48 through the normal LPWA communication. This series of steps allow the transmission data sent from the transmission apparatus 131 to be relayed by the repeater 141 and sent to the reception apparatus 132.

It should be noted that, although the relaying process of the repeater 141 has been described above, it is also possible for the reception apparatus 132 to receive the transmission data by the similar process.

In the reception apparatus 132, when the ModulationID placed in the header is the special ID, that is, when the special transmission has been performed, the LPWA_ID placed in the payload is read and output to the server 133 in association with the position information similarly to the transmission data received in the normal transmission.

The above processes ensure that even the repeater 141 handling the large number of transmission apparatuses 131 need only perform, by communicating only with the small number of special IDs, the process of switching between the small number of transmission frequencies that are assigned to the groups each of which includes the plurality of transmission apparatuses 131 as the communication.

This ensures the reduced processing burden related to the reception process of the repeater 141, thus allowing to achieve not only reduced size and weight but also reduced power consumption of a reception facility.

Also, the special ID is selected randomly on the basis of the transmission time of day, thus suppressing a collision from occurring and allowing to select the maximum number of simultaneous communications commensurate with an application.

Further, in the LPWA communication, ranges of transmission times of the transmission apparatuses 131 can be specified, thus making it possible to specify the transmission time ranges in such a manner that the special IDs, which are the plurality of group IDs, are close to each other.

Accordingly, even if the situation arises where the special transmissions occur almost simultaneously from the plurality of transmission apparatuses 131, a time period taken up by the relaying process on the repeater 141 will not lengthen significantly.

In any case, it becomes possible, as a result, to achieve the repeater that runs on the small-capacity power such as a solar cell or a battery even in a location where commercial power supply cannot be put in place.

<<9. Example of Performing Processes by Software>>

Incidentally, the above series of processes can be performed by hardware or software. In the case where the series of processes are performed by software, a program included in the software is installed from a recording medium to a computer incorporated in dedicated hardware or a general-purpose computer or the like capable of executing various types of functions by installing various types of programs.

Figure 12:
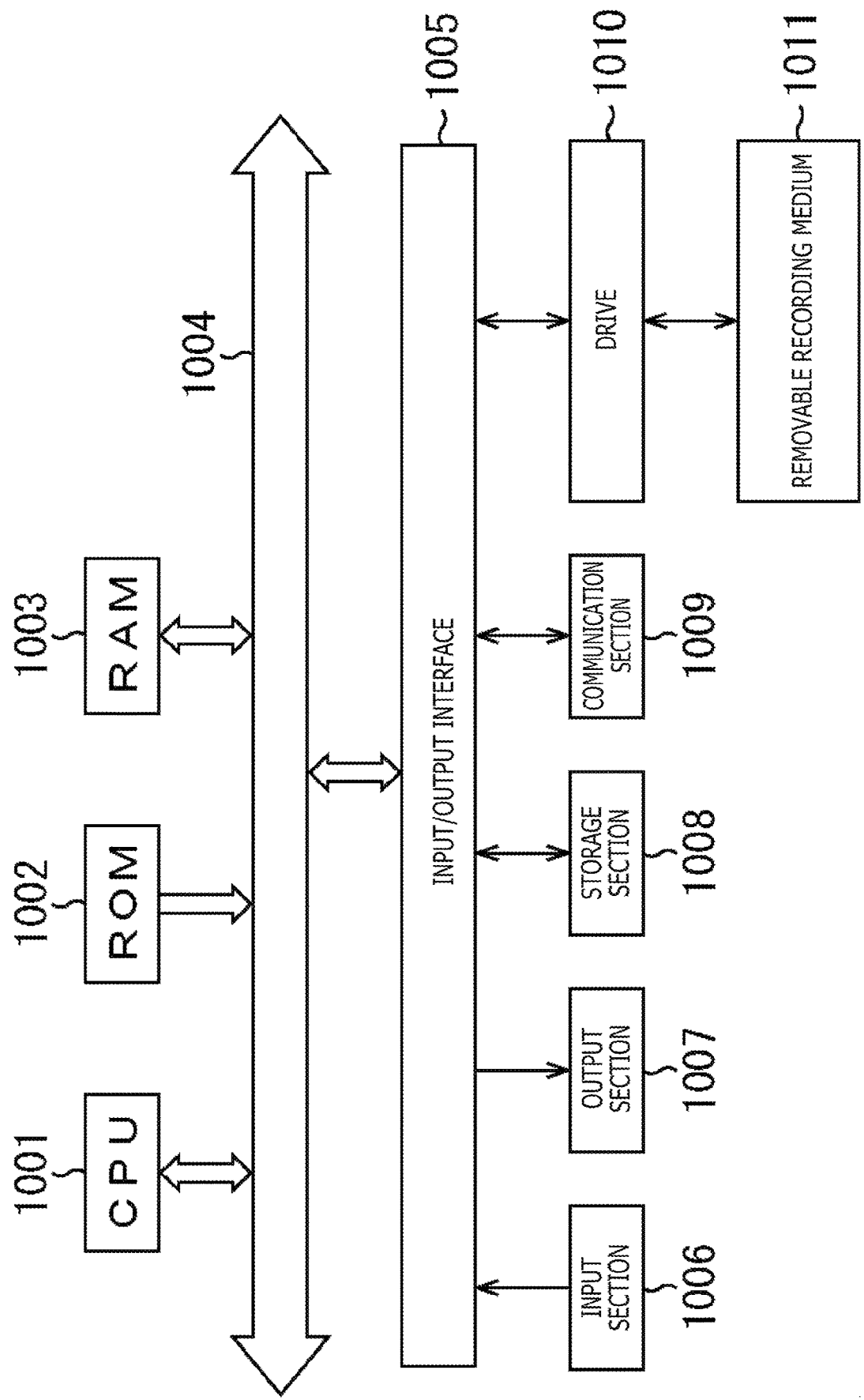
FIG. 12 is a diagram describing a configuration example of a general-purpose personal computer.

FIG. 12 illustrates a configuration example of the general-purpose computer. This personal computer incorporates a CPU (Central Processing Unit) 1001. An input/output interface 1005 is connected to the CPU 1001 via a bus 1004. A ROM (Read Only Memory) 1002 and a RAM (Random Access Memory) 1003 are connected to the bus 1004.

An input section 1006, an output section 1007, a storage section 1008, and a communication section 1009 are connected to the input/output interface 1005. The input section 1006 includes input devices such as a keyboard and a mouse from which the user inputs a manipulation command. The output section 1007 outputs a processing manipulation screen or a processing result image to a display device. The storage section 1008 includes a hard disk drive or the like that stores programs and various types of data. The communication section 1009 includes a LAN (Local Area Network) adapter or the like and performs a communication process via a network typified by the Internet. Also, a drive 1010 is also connected that reads data from and writes data to a removable storage medium 1011 such as a magnetic disk (including flexible disk), an optical disc (including CD-ROM (Compact Disc-Read Only Memory) and DVD (Digital Versatile Disc)), a magneto-optical disk (including MD (Mini Disc)), or a semiconductor memory.

The CPU 1001 performs various types of processes according to the program stored in the ROM 1002 or the program read from the removable storage medium 1011 such as a magnetic disk, an optical disc, a magneto-optical disk, or a semiconductor memory, installed in the storage section 1008, and loaded from the storage section 1008 into the RAM 1003. The RAM 1003 also stores, as appropriate, data required for the CPU 1001 to perform various types of processes.

In the computer configured as described above, the above series of processes are performed, for example, by the CPU 1001 loading the program stored in the storage section 1008 into the RAM 1003 via the input/output interface 1005 and the bus 1004 for execution.

The program executed by the computer (CPU 1001) can be provided, for example, in a manner recorded in the removable storage medium 1011 as a package medium or the like. Also, the program can be provided via a wired or wireless transmission medium such as a local area network, the Internet, or digital satellite broadcasting.

In the computer, the program can be installed to the storage section 1008 via the input/output interface 1005 by inserting the removable storage medium 1011 into the drive 1010. Also, the program can be installed to the storage section 1008 by receiving the program with the communication section 1009 via the wired or wireless transmission medium. In addition to the above, the program can be installed in advance to the ROM 1002 or the storage section 1008.

It should be noted that the program executed by the computer may perform the processes chronologically according to a sequence described in the present specification, in parallel, or at a necessary timing as when the program is called.

Figure 4:
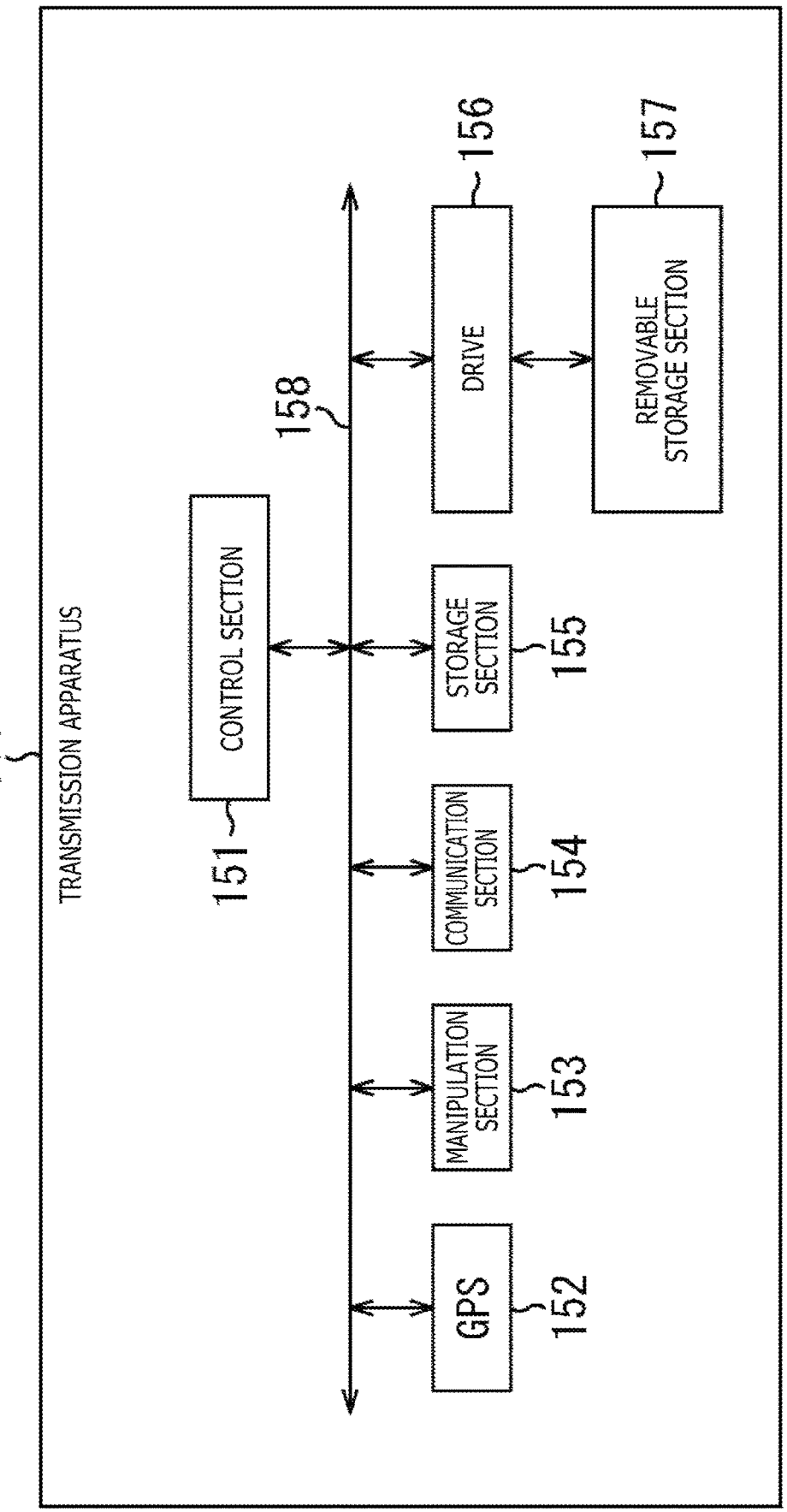
FIG. 4 is a hardware configuration diagram describing a hardware configuration example of a transmission apparatus.
Figure 5:
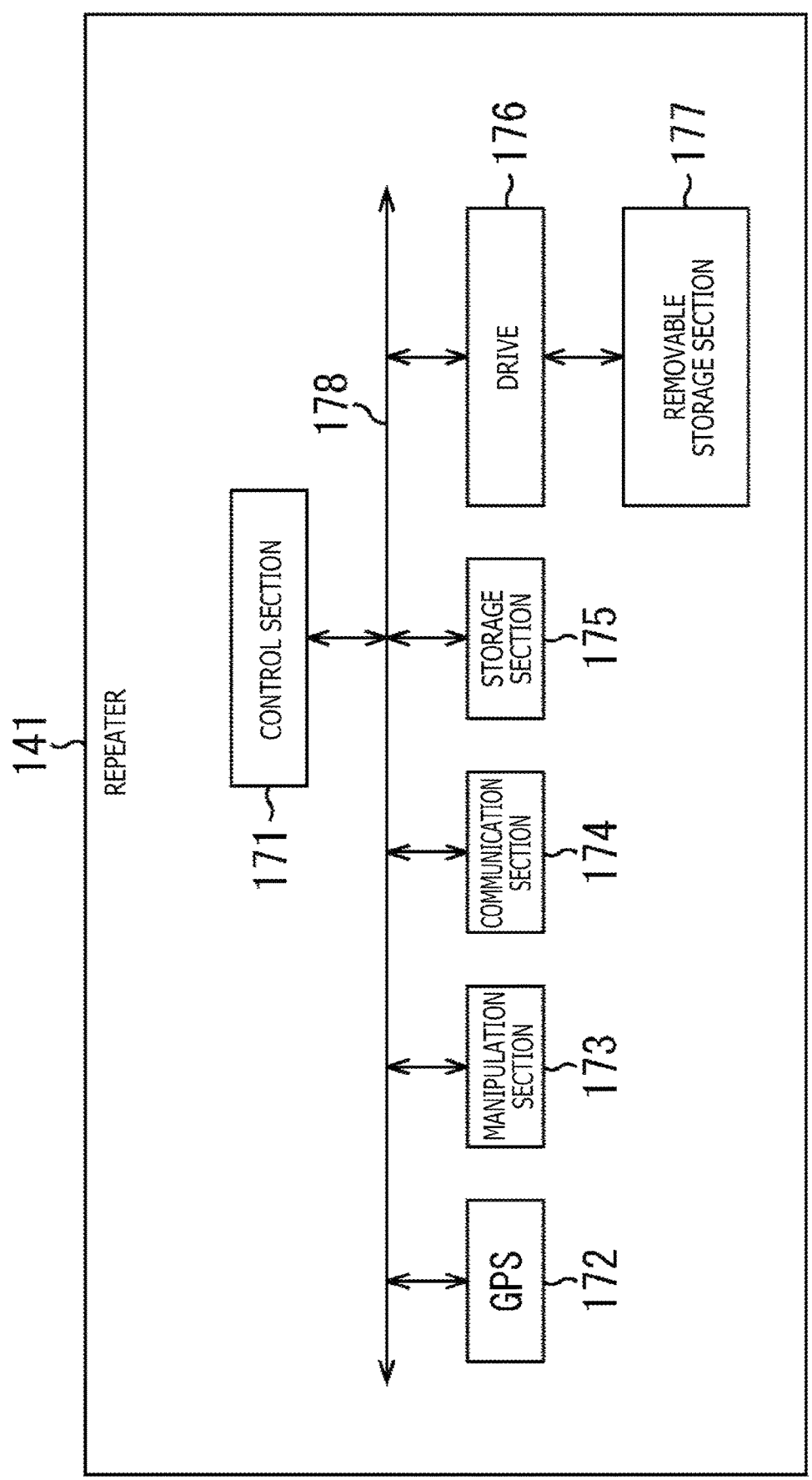
FIG. 5 is a hardware configuration diagram describing a hardware configuration example of a repeater.

It should be noted that the CPU 1001 illustrated in FIG. 12 achieves the functions of the control section 151 illustrated in FIG. 4 and those of the control section 171 illustrated in FIG. 5.

Also, in the present specification, the term "system" refers to a set of a plurality of components (e.g., apparatuses, modules (parts)), and it does not matter whether or not all the components are provided in the same housing. Accordingly, a plurality of apparatuses accommodated in separate housings and connected via a network and a single apparatus whose plurality of modules are accommodated in a single housing are both systems.

It should be noted that embodiments of the present disclosure are not limited to the embodiment described above and may be changed in various ways without departing from the scope of a gist of the present disclosure.

For example, the present disclosure can have a cloud computing configuration in which one function is processed by a plurality of apparatuses in a shared and coordinated manner via a network.

Also, each of the steps described in the above flowcharts may be performed not only by a single apparatus but also by a plurality of apparatuses in a shared manner.

Further, in the case where a single step includes a plurality of processes, the plurality of steps included in that single step may be performed not only by a single apparatus but also by a plurality of apparatuses in a shared manner.

It should be noted that the present disclosure can also have following configurations.

<1> A transmission apparatus including:
a transmission control section adapted to control transmission of communication data to a reception apparatus at a communication time of day and a communication frequency based on individual identification information of the transmission apparatus itself and communication interval information shared by the transmission apparatus itself and the reception apparatus, in which
the transmission control section controls, in specific communication, the transmission of the communication data to the reception apparatus at the communication time of day and the communication frequency based on group identification information set for a group to which the transmission apparatus itself belongs when a plurality of transmission apparatuses including the transmission apparatus itself is divided into a plurality of groups and the communication interval information shared by the transmission apparatus itself and the reception apparatus.

<2> The transmission apparatus of feature <1>, in which
the transmission control section generates the communication data having the individual identification information of the transmission apparatus itself placed in a payload and controls the transmission to the reception apparatus in the specific communication.

<3> The transmission apparatus of feature <1> or <2>, further including:
a group identification information determination section adapted to determine the group identification information on the basis of the individual identification information, time-of-day information, and a count of the pieces of group identification information set for the group to which the transmission apparatus itself belongs.

<4> The transmission apparatus of feature <3>, in which
the group identification information determination section determines the group identification information by using pseudo random numbers whose number of bits corresponds to the count of pieces of group identification information when LFSRs (Linear Feedback Shift Registers) having the individual identification information and the time-of-day information as initial values are used.

<5> The transmission apparatus of feature <3>, further including:
a manipulation section adapted to be manipulated in an event of an emergency situation, in which
the time-of-day information includes a time of day when previous specific communication is completed or when the manipulation section is manipulated.

<6> The transmission apparatus of feature <5>, in which
when the manipulation section is manipulated, the transmission control section sends the communication data to the reception apparatus by the specific communication.

<7> The transmission apparatus of any one of features <1> to <6>, further including:
a communication time-of-day determination section adapted to determine the communication time of day on the basis of the communication interval information and current time-of-day information.

<8> The transmission apparatus of feature <7>, in which
the current time-of-day information includes time-of-day information acquired by a GPS (Global Positioning System) apparatus.

<9> The transmission apparatus of feature <8>, in which
position information acquired by the GPS (Global Positioning System) apparatus is placed in a payload of the communication data.

<10> A transmission method of a transmission apparatus, the transmission apparatus including
a transmission control section adapted to control transmission of communication data to a reception apparatus at a communication time of day and a communication frequency based on individual identification information of the transmission apparatus itself and communication interval information shared by the transmission apparatus itself and the reception apparatus, in which
the transmission control section controls, in specific communication, the transmission of the communication data to the reception apparatus at the communication time of day and the communication frequency based on group identification information set for a group to which the transmission apparatus itself belongs when a plurality of transmission apparatuses including the transmission apparatus itself is divided into a plurality of groups and the communication interval information shared by the transmission apparatus itself and the reception apparatus.

<11> A reception apparatus including:
a reception control section adapted to control reception of communication data at a communication time of day and a communication frequency based on individual identification information of a plurality of transmission apparatuses and communication interval information shared by the transmission apparatuses and the reception apparatus itself, in which
the reception control section controls, in specific communication, the reception of the communication data at the communication time of day and the communication frequency based on group identification information set for a group to which the transmission apparatus belongs when the plurality of transmission apparatuses is divided into a plurality of groups and the communication interval information shared by the transmission apparatus and the reception apparatus itself.

<12> The reception apparatus of feature <11>, in which
the reception control section controls, as the specific communication, the reception of the communication data when the group identification information is placed in a payload of the received communication data.

<13> The reception apparatus of feature <11> or <12>, in which
the group identification information is determined on the basis of the individual identification information of the transmission apparatus that has sent the communication data, time-of-day information, and a count of pieces of group identification information set for a group of the reception apparatus itself.

<14> The reception apparatus of feature <13>, in which
the group identification information is determined by using pseudo random numbers whose number of bits corresponds to the count of pieces of group identification information when LFSRs (Linear Feedback Shift Registers) having the individual identification information and the time-of-day information as initial values are used.

<15> The reception apparatus of any one of features <11> to <14>, in which
the communication time of day is determined on the basis of the communication interval information and current time-of-day information.

<16> The reception apparatus of feature <15>, in which
the current time-of-day information includes time-of-day information acquired by a GPS (Global Positioning System) apparatus.

<17> The reception apparatus of feature <16>, in which
position information acquired by the GPS (Global Positioning System) apparatus of the transmission apparatus is placed in a payload of the communication data.

<18> The reception apparatus of any one of features <11> to <17>, in which
the specific communication includes communication that sends the communication data having position information of the transmission apparatus placed in a payload when a manipulation section to be manipulated in an event of an emergency situation is manipulated in the transmission apparatus.

<19> The reception apparatus of any one of features <11> to <18>, further including:
a transmission control section adapted to relay the communication data received by the reception control section and send the communication data to another reception apparatus.

<20> A reception method of a reception apparatus, the reception apparatus including
a reception control section adapted to control reception of communication data at a communication time of day and a communication frequency based on individual identification information of a plurality of transmission apparatuses and communication interval information shared by the transmission apparatuses and the reception apparatus itself, in which
the reception control section controls, in specific communication, the reception of the communication data at the communication time of day and the communication frequency based on group identification information set for a group to which the transmission apparatus belongs when the plurality of transmission apparatuses is divided into a plurality of groups and the communication interval information shared by the transmission apparatus and the reception apparatus itself.

REFERENCE SIGNS LIST

101: Communication system
131: Transmission apparatus
132: Reception apparatus
133: Cloud server
141: Repeater
151: Control section
152: GPS
153: Manipulation section
154: Communication section
155: Storage section
156: Drive
157: Removable storage section
171: Control section
172: GPS
173: Manipulation section
174: Communication section
175: Storage section
176: Drive
177: Removable storage section
201: Normal transmission parameter storage section
202: Special transmission parameter section
203: Transmission parameter selection section
204: Transmission time-of-day determination section
205: Selection section
206: LPWA_ID storage section
207: Special ID determination section
208: ID selector
209: Transmission control section
221, 222: LFSR
223: PRN
241: Reception time-of-day list
242: Time-of-day information acquisition section
243: Reception control section
244: Special ID processing section
245: Transmission control section

The invention claimed is:

1. A transmission apparatus, comprising:
one or more first processors configured to:
transmit communication data to a reception apparatus, at a communication time of day and a communication frequency, based on individual identification information of the transmission apparatus and communication interval information shared by the transmission apparatus and the reception apparatus;
determine group identification information for a first group of transmission apparatuses among a plurality of transmission apparatuses based on the individual identification information, time-of-day information, and a count of pieces of the group identification information for the first group, wherein
the plurality of transmission apparatuses is divided into a plurality of groups of transmission apparatuses, and
the transmission apparatus belongs to the first group of the plurality of groups of transmission apparatuses;
set the group identification information for the first group of transmission apparatuses that includes the transmission apparatus; and
in a specific communication, transmit the communication data to the reception apparatus at the communication time of day and the communication frequency based on the set group identification information of the first group and the communication interval information.

2. The transmission apparatus of claim 1, wherein
the one or more processors are further configured to generate the communication data, in which the group identification information of the transmission apparatus is in a payload, in a case where the transmission of the communication data to the reception apparatus is in the specific communication.

3. The transmission apparatus of claim 1, wherein
the one or more processors are further configured to determine the group identification information based on pseudo random numbers whose number of bits corresponds to the count of the pieces of the group identification information, and
the individual identification information and the time-of-day information are used as initial values for Linear Feedback Shift Registers (LFSRs).

4. The transmission apparatus of claim 1, further comprising
a manipulation circuit configured to be manipulated in an event of an emergency situation, wherein the time-of-day information includes a time of day at which one of a previous specific communication is completed or the manipulation circuit is manipulated.

5. The transmission apparatus of claim 4, wherein in an event the manipulation circuit is manipulated, the one or more processors are further configured to send the communication data to the reception apparatus by the specific communication.

6. The transmission apparatus of claim 1, wherein the one or more processors are further configured to determine the communication time of day based on the communication interval information and current time-of-day information.

7. The transmission apparatus of claim 6, wherein the current time-of-day information includes the_time-of-day information acquired by a Global Positioning System (GPS) apparatus.

8. The transmission apparatus of claim 7, wherein the one or more processors are further configured to place position information acquired by the GPS apparatus in a payload of the communication data.

9. A transmission method of a transmission apparatus, the transmission method comprising:
   transmitting communication data to a reception apparatus, at a communication time of day and a communication frequency, based on individual identification information of the transmission apparatus and communication interval information shared by the transmission apparatus and the reception apparatus;
   determining group identification information for a first group of transmission apparatuses among a plurality of transmission apparatuses based on the individual identification information, time-of-day information, and a count of pieces of the group identification information for the first group, wherein
      the plurality of transmission apparatuses is divided into a plurality of groups of transmission apparatuses, and
      the transmission apparatus belongs to the first group of the plurality of groups of transmission apparatuses;
   setting the group identification information for the first group of transmission apparatuses that includes the transmission apparatus; and
   in a specific communication, transmitting the communication data to the reception apparatus at the communication time of day and the communication frequency based on the set group identification information of the first group and the communication interval information.

10. A first reception apparatus, comprising:
   one or more second-processors configured to:
      receive communication data at a communication time of day and a communication frequency based on individual identification information of a plurality of transmission apparatuses and communication interval information shared by a transmission apparatus of the plurality of transmission apparatuses and the first reception apparatus; and,
      in a specific communication, receive the communication data at the communication time of day and the communication frequency based on group identification information set for a first group of transmission apparatuses and the communication interval information, wherein
         the plurality of transmission apparatuses that includes the transmission apparatus is divided into a plurality of groups of transmission apparatuses,
         the transmission apparatus belongs to the first group of the plurality of groups of transmission apparatuses,
         the group identification information for the first group of transmission apparatuses that includes the transmission apparatus, is set by the transmission apparatus, and
         the group identification information for the first group of transmission apparatuses is based on the individual identification information of the transmission apparatus that has sent the communication data, time-of-day information, and a count of pieces of the group identification information set for the first group.

11. The first reception apparatus of claim 10, wherein the one or more processors are further configured to control, as the specific communication, the reception of the communication data in a case where the group identification information is in a control payload of the received communication data.

12. The first reception apparatus of claim 10, wherein
   the group identification information is determined based on pseudo random numbers whose number of bits corresponds to the count of the pieces of the group identification information, and
   the individual identification information and the time-of-day information are used as initial values for Linear Feedback Shift Registers (LFSRs).

13. The first reception apparatus of claim 10, wherein the communication time of day is determined by the transmission apparatus based on the communication interval information and current time-of-day information.

14. The first reception apparatus of claim 13, wherein the current time-of-day information includes the time-of-day information acquired by a Global Positioning System (GPS) apparatus.

15. The first reception apparatus of claim 14, wherein position information acquired by the GPS apparatus of the transmission apparatus is in a payload of the communication data.

16. The first reception apparatus of claim 10, wherein the specific communication includes communication that sends the communication data having position information of the transmission apparatus in a payload in a case where a manipulation circuit is manipulated in the transmission apparatus.

17. The first reception apparatus of claim 10, wherein the one or more processors are further configured to relay the received communication data and send the received communication data to a second reception apparatus.

18. A reception method of a reception apparatus, the reception method comprising:
   receiving communication data at a communication time of day and a communication frequency based on individual identification information of a plurality of transmission apparatuses and communication interval information shared by a transmission apparatus of the plurality of transmission apparatuses and the reception apparatus; and,
   in a specific communication, receiving the communication data at the communication time of day and the communication frequency based on group identification information set for a first group of transmission apparatuses and the communication interval information, wherein
      the plurality of transmission apparatuses that includes the transmission apparatus is divided into a plurality of groups of transmission apparatuses,
      the transmission apparatus belongs to the first group of the plurality of groups of transmission apparatuses, the group identification information for the first group of transmission apparatuses that includes the transmission apparatus, is set by the transmission apparatus, and the group identification information for the first group of transmission apparatuses is based on the individual identification information of the transmission apparatus that has sent the communication data, time-of-day information, and a count of pieces of the group identification information set for the first group.

\* \* \* \* \*